United States Patent
Polonowski et al.

(10) Patent No.: US 9,903,307 B2
(45) Date of Patent: Feb. 27, 2018

(54) METHOD OF FUEL INJECTION CONTROL

(71) Applicant: Ford Global Technologies, LLC, Dearborn, MI (US)

(72) Inventors: Christopher Polonowski, Bellleville, MI (US); Eric Matthew Kurtz, Dearborn, MI (US); Andrew Lauri, Dearborn Heights, MI (US); Michiel J. Van Nieuwstadt, Ann Arbor, MI (US); Paul Joseph Tennison, West Bloomfield, MI (US); Jonathan Finchum, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 14/987,561

(22) Filed: Jan. 4, 2016

(65) Prior Publication Data
US 2017/0191442 A1    Jul. 6, 2017

(51) Int. Cl.
*F02D 41/40*    (2006.01)
*F02D 41/06*    (2006.01)
*F02D 41/30*    (2006.01)

(52) U.S. Cl.
CPC ......... *F02D 41/403* (2013.01); *F02D 41/064* (2013.01); *F02D 41/068* (2013.01); *F02D 41/3076* (2013.01); *F02D 41/401* (2013.01)

(58) Field of Classification Search
CPC .... F02D 41/401; F02D 41/402; F02D 41/403; F02D 41/068

USPC .......................................... 123/299, 300, 304
See application file for complete search history.

(56) References Cited

U.S. PATENT DOCUMENTS

| | | | |
|---|---|---|---|
| 6,619,255 B2 | 9/2003 | Urushihara et al. | |
| 6,804,952 B2 | 10/2004 | Sasaki et al. | |
| 6,877,313 B1 | 4/2005 | Phillips et al. | |
| 6,994,072 B2 | 2/2006 | Kuo et al. | |
| 7,007,664 B2 | 3/2006 | Takemoto et al. | |
| 7,156,070 B2 | 1/2007 | Strom et al. | |
| 7,222,602 B2 | 5/2007 | Fukasawa | |
| 7,255,090 B2 | 8/2007 | Fader et al. | |
| 7,739,999 B2 | 6/2010 | Kang et al. | |
| 8,412,442 B2 | 4/2013 | Kurtz | |
| 8,442,744 B2 | 5/2013 | Kurtz et al. | |
| 8,826,884 B2 | 9/2014 | Kang et al. | |
| 8,997,456 B2 | 4/2015 | Wolk et al. | |
| 2011/0172897 A1* | 7/2011 | Tsuzuki | F02D 35/023 701/103 |

FOREIGN PATENT DOCUMENTS

WO    02073018 A1    9/2002

* cited by examiner

*Primary Examiner* — Mahmoud Gimie
(74) *Attorney, Agent, or Firm* — Julia Voutyras; McCoy Russell LLP (57) ABSTRACT

Methods and systems are provided for improving engine performance at high load conditions with reduced combustion phasing while maintaining in-cylinder peak pressures within limits. Following a pilot fuel injection, a main fuel injection is split into multiple smaller injections, the smaller injections spread around a timing of the main fuel injection so that peak cylinder pressures for each injection are within cylinder pressure limits. In this way, more enthalpy is created for expediting warming of exhaust catalysts.

18 Claims, 6 Drawing Sheets

METHOD OF FUEL INJECTION CONTROL

TECHNICAL FIELD

The present application relates generally to an internal combustion engine having multiple injections per cylinder per combustion cycle.

BACKGROUND AND SUMMARY

During selected engine operating conditions, combustion phasing may be retarded to reduce peak in-cylinder pressures. As such, peak cylinder pressures may be reduced to maintain in-cylinder pressures within a limit above which cylinder integrity can be affected. The retarded combustion phasing may include retarded ignition timing (to a sub-optimal timing) in spark ignition engines, or retarded fuel injection timing in compression ignition engines. Retarded combustion phasing may also be used during engine calibration when an exhaust emission control device (e.g., an after-treatment system coupled to a diesel engine) is not fully functional. The retarded combustion phasing is using therein to increase the exhaust temperature and reduce NOx.

The inventors herein have recognized that retarding combustion phasing to limit peak cylinder pressures can degrade engine performance, in particular full load performance. The retarded combustion phasing also results in higher fuel consumption and higher exhaust temperatures than may be possible with more advanced combustion phasing, resulting in the engine's torque and power output being limited. The issue may be exacerbated when the engine is operating with low energy density fuels such as biodiesel, or other oxygenated fuels.

Likewise, when retarded combustion phasing is used for expediting catalyst heating, there may be an increase in hydrocarbon (HC) emissions. If the combustion phasing retard is limited to control the HC emissions, there may be a resultant limiting of the level of exhaust temperature or enthalpy that can be provided by the combustion phasing (in other words, less than the desired amount of heating). Other calibration parameters, such as EGR flow, can be adjusted to provide a trade-off with exhaust temperature. However, the calibration may not be as efficient in engine systems having multiple exhaust catalysts. For example, if an upstream oxidation catalyst becomes partially or fully active before a downstream reduction catalyst, the engine may continue to be calibrated for reduced HC emissions, thereby limiting the exhaust temperature at a higher NOx level. Overall, engine performance is degraded and the engine may be rendered emissions non-compliant.

In some engine systems, in lieu of retarding combustion phasing, peak firing pressures and exhaust temperatures may be raised by increasing a fuel injector nozzle size. Therein, the larger nozzle size allows for a higher fuel flow through an injector, resulting in a larger amount of fuel being delivered into a cylinder per injection. However, the inventors have recognized that the additional hardware can increase engine costs. Furthermore, the increased nozzle size can also result in degraded fuel economy and engine performance.

In one example, some of the above issues may be at least partly addressed by a method for an engine, comprising: in response to predicted peak in-cylinder pressure for a planned main fuel injection into a cylinder occurring later than a threshold timing, splitting the planned main fuel injection into at least a first and a second injection, wherein the first injection is advanced relative to a timing of the planned main fuel injection. In this way, exhaust temperatures may be controlled while maintaining cylinder pressure within limits, improving engine efficiency.

As an example, a main fuel injection may be split into two or more injections to provide a cylinder pressure profile wherein the cylinder peak pressure is at a target pressure. In particular, if the originally planned main fuel injection has a peak cylinder pressure that is higher than the target cylinder pressure (that is, a defined peak cylinder pressure target for the given engine operating conditions), the main fuel injection timing may be retarded to limit the cylinder pressure. To recoup at least some of the loss in performance and enthalpy resulting from the combustion phasing retard, the main fuel injection may be split into at least two injections with the first injection occurring at a timing earlier than/advanced from the timing of the originally planned main fuel injection, and the second injection occurring at a timing equivalent to or later than the timing of the originally planned a main fuel injection. The timing of the split injections may be adjusted based on engine parameters such as engine speed, load, boundary conditions, and engine architecture. While advancing the timing of the first injection, a proportion of the total fuel provided in the first injection is increased such that a peak cylinder pressure resulting from the first injection is at a pressure, which is at or just below the peak cylinder pressure target (or limit). At the same time, the amount of fuel provided in the second injection is correspondingly decreased, to maintain the total fuel injection quantity of the originally planned injection (or with the injection quantity adjusted to meet user commanded engine torque). A timing of the second injection is retarded such that a peak cylinder pressure resulting from the second injection occurs as close as possible to the peak cylinder pressure of the first injection, while maintaining the cylinder pressure within the cylinder pressure limit. In one example, the split fuel injection may be used for a main fuel injection in each cylinder until an exhaust temperature is sufficiently high to heat one or more exhaust catalysts, such as an upstream oxidation catalyst and a downstream reduction catalyst. Additionally or alternatively, the split fuel injection may be maintained until the exhaust temperature is high enough to raise the turbine inlet temperature above a target temperature.

By using the split fuel injection when the peak cylinder pressure limits are reached or exceeded, engine efficiency is improved, and maximum torque is achieved while keeping exhaust temperature below the maximum exhaust temperature limit. In this case, splitting the main injection allows more fuel to be injected, thereby producing more torque without increasing exhaust temperatures. By using the split injection to expedite catalyst light-off, the injection timings of the split injection may be shifted to increase exhaust temperatures if they are below the maximum exhaust temperature limit. In this case, the spit injection can also be used to provide a main injection—post injection strategy.

In this way, a main fuel injection may be split into a first injection that is as advanced as possible, and a second injection that is as close to the end of the first injection as possible. The use of a split injection reduces the amount of combustion phasing retard required to maintain peak cylinder pressures within pressure limits. As such, this improves fuel economy and engine performance, particularly at high loads. In addition, the peak cylinder pressures of the first and second injections may be provided sufficiently close to each other such that exhaust temperatures are raised quickly, improving emissions performance and reducing turbo lag. As such, this allows for increased engine power even when operating with low energy density fuels. Furthermore, the increased engine performance can be achieved without costly changes to hardware, such as while using low flow injector nozzles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
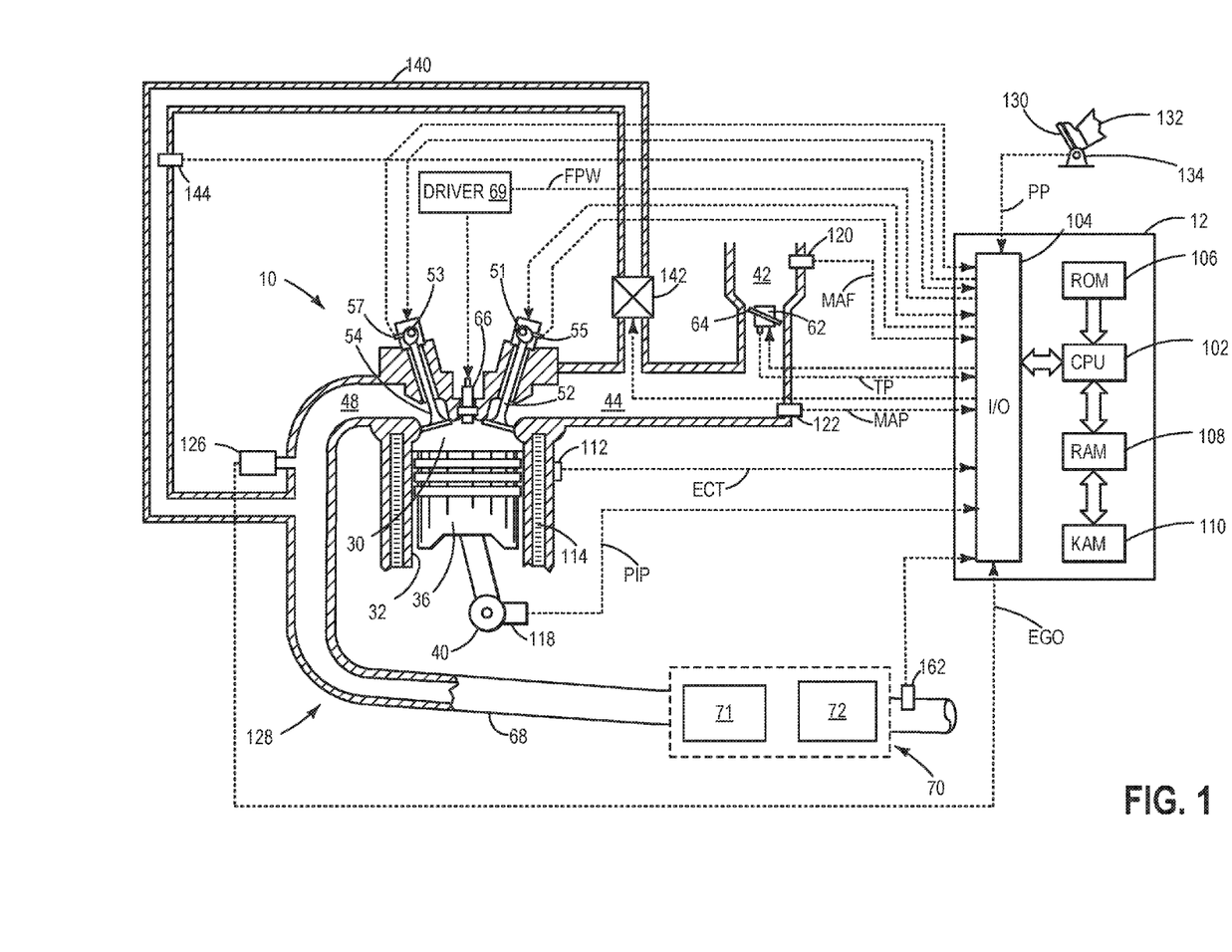
FIG. 1 shows a schematic diagram of an engine.

The following description relates to a method for controlling and adjusting the profile (including timing, amount, and number of injections per cycle) of a main fuel injection and optionally a preceding pilot fuel injection in an engine system, such as the engine system of FIG. 1. An engine controller may perform a control routine, such as the examples routines of FIGS. 2-4 and 6, to split at least a main fuel injection into a cylinder based on engine operating conditions, so as to increase engine torque and power while maintaining cylinder peak pressures within predefined limits. In particular, the engine may be operated with multiple injections per combustion cycle, the injections calibrated based on exhaust temperature and cylinder pressure constraints, as shown in FIG. 5.

Referring now to FIG. 1, it shows a schematic diagram with one cylinder of multi-cylinder engine 10, which may be included in a propulsion system of a vehicle. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber 30 (also termed, cylinder 30) of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust manifold 48 to exhaust passage 68. The intake manifold 44 and the exhaust manifold 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein in proportion to the pulse width of signal FPW received from controller 12 via electronic driver 69. In this manner, fuel injector 66 provides what is known as direct injection of fuel into combustion chamber 30. In other examples, the fuel injector may be mounted in the side of the combustion chamber or in the top of the combustion chamber, for example. In other examples, fuel injector 66 may be coupled to an intake port to provide what is known as port fuel injection. Further still, cylinder 30 may be configured to receive fuel from each of multiple direct fuel injectors, multiple port fuel injectors, or each of a port and direct fuel injector. Fuel may be delivered to fuel injector 66 by a fuel system (not shown) including a fuel tank, a fuel pump, and a fuel rail.

Fuel may be delivered by fuel injector 66 to cylinder 30 over a plurality of injections during a combustion cycle. The plurality of injections may include multiple injections during the compression stroke, multiple injections during the intake stroke, or a combination of some direct injections during the compression stroke and some during the intake stroke. As elaborated herein with reference to FIGS. 2-4, during selected conditions, exhaust temperatures may be raised by splitting a main fuel injection (that is, an injection following a pilot injection and preceding a post injection) into two or more injections. The two or more split injections may be performed in a compression stroke for a compression ignition engine, a timing and duration of the injections adjusted so that peak cylinder pressures resulting from each of the split injections are at a target pressure (e.g., at or just below a cylinder pressure limit, but not above it), and consecutive (e.g., within a threshold distance/time of each other). In addition, based on NVH considerations, a pilot injection may also be split into two or more injections.

Likewise, when there are multiple fuel injectors coupled to the cylinder, each injector may deliver a portion of a total fuel injection that is combusted in cylinder 30. Further, the distribution and/or relative amount of fuel delivered from each injector may vary with operating conditions, such as engine load, engine temperature, knock, etc. Note that these are merely examples of different injection ratios, and split ratios, and various other injection and split ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc. in examples where the engine is a compression ignition engine, a timing of combustion phasing may be varied (e.g., retarded) by adjusting (e.g., retarding) fuel injection timing. In examples where the engine is a spark ignition engine, a timing of combustion phasing may be varied (e.g., retarded) by adjusting (e.g., retarding) spark timing or fuel injection timing, or by varying spark energy.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 68 to the intake manifold 44 via an EGR passage 140. The amount of EGR provided may be varied by controller 12 via an EGR valve 142. By introducing exhaust gas to the engine 10, the amount of available oxygen for combustion is decreased, thereby reducing combustion flame temperatures and reducing the formation of $NO_x$, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust manifold 48 upstream of an emission control system 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor.

Emission control system 70 is shown arranged along exhaust passage 68 downstream of exhaust gas sensor 126. Emission control system 70 may be a selective catalytic reduction (SCR) system, three way catalyst (TWC), $NO_x$ trap, various other emission control devices, or combinations thereof. For example, emission control system 70 may include an SCR catalyst 71 and a diesel particulate filter (DPF) 72. In some embodiments, DPF 72 may be located downstream of the SCR catalyst 71 (as shown in FIG. 1), while in other embodiments, DPF 72 may be positioned upstream of the SCR catalyst 71 (not shown in FIG. 1). Emission control system 70 may further include exhaust gas sensor 162. Sensor 162 may be any suitable sensor for providing an indication of a concentration of exhaust gas constituents such as a $NO_x$, $NH_3$, etc. and may be an EGO or particulate matter (PM) sensor, for example. In some embodiments sensor 162 may be located downstream of DPF 72 (as shown in FIG. 1), while in other embodiments, sensor 162 may be positioned upstream of DPF 72 (not shown in FIG. 1). Further, it will be appreciated that more than one sensor 162 may be provided in any suitable position.

Further, in some embodiments, during operation of engine 10, emission control system 70 may be periodically reset by operating at least one cylinder of the engine within a particular air/fuel. ratio.

Controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126 and 162. Engine speed. signal, RPM, may be generated by controller 12 from a signal PIP. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In addition to the above sensors, a combustion sensor (not shown) may be coupled to an individual cylinder on a per cylinder basis. The combustion sensor may be an appropriate sensor as known in the art for example a knock sensor, a vibration sensor, a temperature sensor, a pressure sensor, etc. or any combination thereof. The combustion sensor may sense combustion relevant parameters such as a peak pressure value, the location of a peak pressure, the timing of a peak pressure, or any combination thereof, for example. For example, each cylinder may include an in-cylinder pressure sensor for estimating cylinder pressure changes over a combustion event in the cylinder. A peak cylinder pressure (e.g., peak pressure value and timing) may be determined based on the output of the in-cylinder pressure sensor.

The controller 12 receives signals from the various sensors of FIG. 1 and employs the various actuators of FIG. 1 to adjust engine operation based on the received signals and instructions stored on a memory of the controller. For example, based on input from an in-cylinder pressure sensor, the controller may adjust a timing and duration of opening of a cylinder fuel direct injector. As another example, based on input from the in-cylinder pressure sensor, the controller may adjust spark ignition timing. The storage medium read-only memory 106 can be programmed with non-transitory, computer readable data representing instructions executable by the processor 102 for performing the routines described below as well as other variants that are anticipated but not specifically listed. Example routines are described herein with reference to FIGS. 2-5 and 6.

As described above, FIG. 1 shows only one cylinder of a multi-cylinder engine, and each cylinder may similarly include its own set of intake/exhaust valves, fuel injector, etc.

Figure 2:
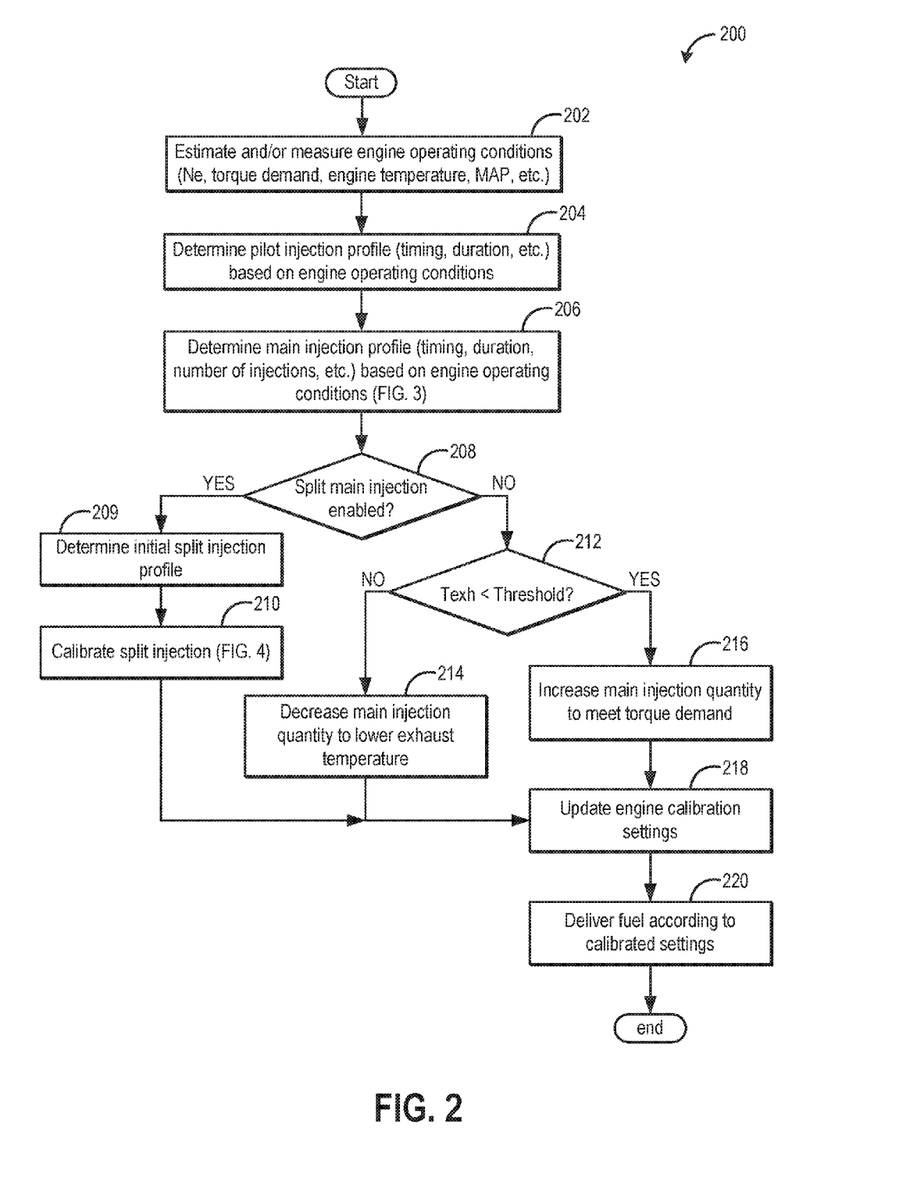
FIG. 2 depicts a flowchart of an example method for adjusting the profile of a main injection and a preceding pilot injection, in accordance with the present disclosure.

Turning now to FIG. 2, an example method 200 is shown for combustion phasing control. In particular, combustion phasing may be adjusted by adjusting the profile of a pilot fuel injection and a main fuel injection to provide a desired enthalpy while enabling a target cylinder peak pressure to be attained. Method 200 may thereby constitute a primary control loop for combustion phasing control. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine operating conditions. These include, for example, engine speed, indicated torque demand, indicated mean effective pressure (IMEP), manifold pressure (MAP), manifold air flow (MAF), ambient conditions (ambient temperature, pressure, and humidity, for example), engine fuel consumption (relative to a target fuel consumption rate), etc. Still other parameters that may be considered may include engine geometry (bore size, engine displacement, effective compression ratio, etc.), and intake boundary conditions (pressure, temperature, mass flow, etc.). Further still, a type of fuel being injected into the engine (or that is available in the fuel tank) may be determined. In one example, this includes determining an octane rating of the available fuel and/or an energy density of the available fuel.

At 204, based on the estimated engine operating conditions, a pilot fuel injection profile may be determined. As such, the pilot injection may include an injection used as a source of ignition (in lieu of spark) for a subsequent main combustion. It will be appreciated that herein all fuel injections delivered prior to a main injection are termed pilot injections. As one example, the pilot injection quantity may be 1-20% of the total injected fuel depending upon the total fuel quantity demanded and injector minimum delivery quantity at a given rail pressure.

Determining the pilot fuel injection profile includes determining a timing of the injection, an amount of the total fuel to be delivered in the injection, and a duration of the injection. As one example, the pilot injection may be initiated at 40 CAD before TDC and continued till 32 CAD before TDC. For example, in a 6.7 L, engine operating at an idle condition, the total amount of fuel delivered may be 10 mg/stroke. Herein, idle pilot quantities can range from 7% (or 0.7 mg/stroke as minimum delivery) to 20% (or 2 mg/stroke). In an example of a 3.2 L engine that operates with about 7 mg/stroke, the pilot injection quantity may be about 2 mg/stroke or higher.

At 206, based on the estimated engine operating conditions, a main fuel injection profile may be determined. As such, the main injection may include an injection used for the main combustion event in the cylinder. It will be appreciated that herein all fuel injections delivered after a pilot injection and prior to a post injection are termed main injections. As one example, the main injection may provide 55-98% of the total fuel depending upon the total fuel quantity demanded and injector minimum delivery quantity at a given rail pressure.

Determining the main fuel injection profile includes determining a timing of the injection, an amount of the total fuel to be delivered in the injection, and a duration of the injection. In addition, as elaborated with reference to FIG. 3, determining the main fuel injection profile may also include determining whether to deliver the main fuel injection as a single injection or split into a set of multiple smaller injections. As such, during engine operation at full load, a timing of a planned main fuel injection may be retarded (herein also referred to as retarded combustion phasing) in order to reduce peak cylinder pressures below a cylinder pressure limit. The peak pressure is limited to mitigate cylinder degradation. However, the retarded combustion phasing results in a sub-optimal combustion timing which leads to a higher engine fuel consumption rate than desired. In addition, exhaust temperatures may be higher than desired. This not only affects engine fuel economy, but also affects engine performance due to limiting of engine torque and power. In some examples, it may also result in non-uniform heating and activation of exhaust catalysts (such as due to an upstream catalyst being activated while a downstream catalyst remains inactive). As elaborated herein, in response to the predicted peak in-cylinder pressure for a planned main fuel injection into a cylinder occurring later than a threshold timing, wherein the threshold timing is an optimal timing based on maximum engine output torque (that is, during conditions of retarded combustion phasing), an engine controller may split the planned main fuel injection into at least a first and a second injection. Further, the first injection may be delivered advanced relative to a timing of the planned main fuel injection while the second injection is delivered retarded relative to the timing of the planned main fuel injection. The technical effect of splitting the main injection into multiple smaller injections is that a larger amount of enthalpy may be extracted from the combustion event with the use of less combustion phasing retard, and while maintaining the cylinder pressures closer to the target pressure (and within the pressure limit of the cylinder). This allows for improved fuel economy and engine performance.

As such, the main injection profile may be adjusted to affect the primary fueling injection(s) that significantly affect the engine's power output. Typically pilot injections do not significantly increase the power or torque output of the engine directly. Thus, the injection profile may leave the pilot injection profile unaltered. However, a split main injection strategy may use a pilot injection (that is, an injection labeled as a "pilot" injection by the engine controller) but the injected quantity would be very high (>10%) and would be timed such that it generates significantly positive work by the engine. Therein, the pilot injection may be used as an additional main injection event and no longer as it was originally intended (or labeled) as a traditional pilot injection. In other words, and as elaborated below, the "pilot" injection may become a main injection, regardless of its label.

At 208, it may be confirmed if a split main injection has been enabled. As elaborated below with reference to the method of FIG. 3, in one example, a split main injection may be enabled in response to a planned main fuel injection being retarded more than a threshold timing. Alternatively, a split main injection may be enabled in response to a peak cylinder pressure for the planned main fuel injection occurring later than a threshold timing. If a split main injection is enabled, at 209, the method includes determining an initial profile for the split fuel injection. For example, a number of injections of the split injection may be determined. As such, the main injection may be split into at least a first and a second injection. In addition to the number of injections of the split injection, the initial split injection profile may include an initial timing of each injection (such as a start of injection timing, an end of injection timing, and an average injection timing), a duration of each injection, and an amount of fuel in each injection.

The absolute maximum number of injections may be limited by the engine controller based on engine conditions and further based on injector capability. The number of injections may be determined based on the operating conditions and minimum dwell time between injections by the fuel injector. In one example, the number of fuel injections may be adjusted to be a number that is sufficient to produces a constant/flat cylinder pressure at the maximum cylinder pressure level as early as possible in the compression stroke while simultaneously advancing the end of combustion timing as much as possible. The larger number of fuel injections enables greater control over the rate of heat release from the combustion while minimizing the peaks in the cylinder pressure trace. It also adds additional dwell times between injections which retards the end of injection of the final fuel injection and therefore retards the end of combustion timing.

At 210, the method further includes calibrating the split injection. As elaborated with reference to FIG. 4, calibrating the main fuel injection includes adjusting the amount, timing, and duration of each injection of the split fuel injection based on a peak pressure of the cylinder to optimize main injection timing advance and provide two or more peaks at a target cylinder pressure (such as at the maximum cylinder pressure). The injections may be calibrated to improve fuel economy (such as by reducing brake specific fuel consumption, BSFC) of the engine, and extract the most enthalpy/heat out of the combustion event. Upon calibrating the split injection, the method moves to 218 wherein the engine calibration settings are updated and at 220, the engine is operated with fuel delivered according to the determined fuel injection profiles and calibrated settings.

If a split main injection is not enabled, then at 212, the method includes determining if the exhaust temperature is lower than a threshold temperature. In one example, the threshold temperature is based on the light-off or activation temperature of an exhaust catalyst, such as one or more of an upstream oxidation catalyst and a downstream reduction catalyst. If the exhaust temperature is not lower than the threshold, that is, if the exhaust is sufficiently hot, then at 214, the method includes decreasing the quantity of fuel in the (single) main injection to lower the exhaust temperature.

The quantity of fuel in the main injection may be decreased by reducing the pulse width of the injection or advancing a timing of the end of the injection (EOI). Thereafter, the method moves to 218 wherein the engine calibration settings are updated and the engine is operated with fuel delivered according to the determined fuel injection profile.

If the exhaust temperature is lower than the threshold, that is, if the exhaust is not sufficiently hot, then at 216, the method includes increasing the quantity of fuel in the (single) main injection to meet the torque demand while also raising the exhaust temperature. The quantity of fuel in the main injection may be increased by increasing the pulse width of the injection or retarding a timing of the end of the injection (EOI). Thereafter, the method moves to 218 wherein the engine calibration settings are updated and at 220, the engine is operated with fuel delivered according to the determined fuel injection profile and calibrated settings.

Figure 3:
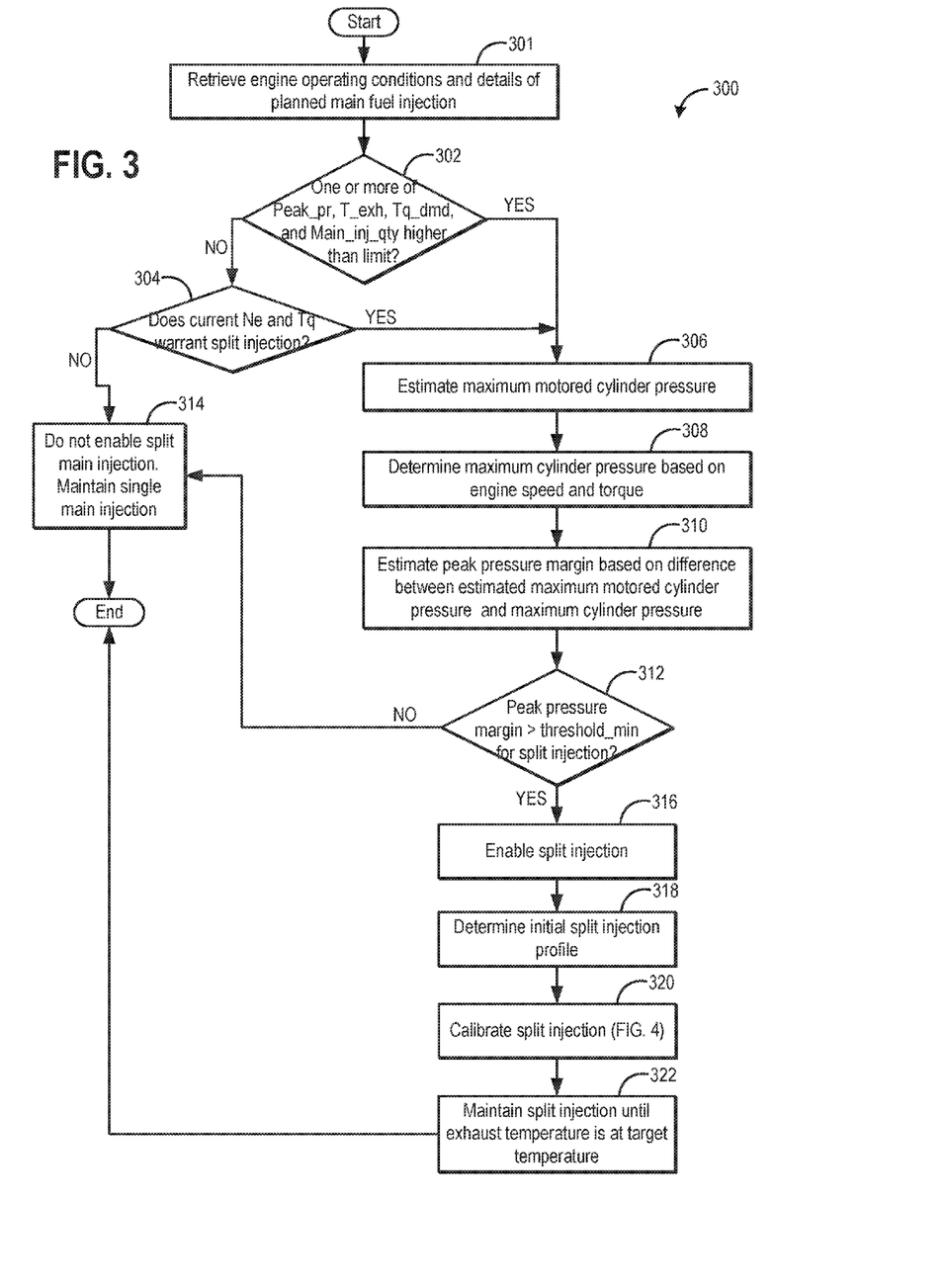
FIG. 3 depicts a flowchart illustrating an example method for determining whether to split the main fuel injection based on exhaust temperature and cylinder pressure constraints.

Now turning to FIG. 3, an example method 300 is provided for determining a main injection profile. In particular, method 300 enables a controller to decide whether or not to enable the planned main injection to be split into multiple smaller injections. In other words, method 300 may constitute a split injection enablement decision sub-routine of the primary control loop of method 200. In one example, method 300 may be executed as part of method 200, such as at 206.

At 301, the method includes retrieving data pertaining to the estimated engine operating conditions (such as those estimated and/or measured at FIG. 2 at 202). In addition, details regarding a planned main fuel injection may be retrieved. For example, the controller may determine an initial planned main fuel injection profile based on the estimated operating conditions, and then further determine whether to split the main fuel injection based on specific considerations discussed below.

At 302, the method includes determining if one or more of a peak cylinder pressure (Peak_pr), an exhaust temperature (T_exh), an operator torque demand (Tq_dmd), and a planned main fuel injection quantity (Main_inj_qty) is higher than a corresponding limit. In one example, a peak cylinder pressure target may be defined for the given engine operating conditions and it may be determined if the cylinder pressure is at or above the peak cylinder pressure target. The peak cylinder pressure may be above the target pressure if a planned main fuel injection into a cylinder is occurring later than a threshold timing, such as later than an optimal timing based on maximum engine output torque. If the corresponding limits/targets have not been exceeded, at 304, the method includes determining if the current engine speed and indicated torque warrant a split main injection. For example, the controller may reference a predefined calibration table that indicates injection profiles (e.g., single or split injection) as a function of engine speed and load. If the engine speed and torque do not warrant a split main injection, then at 314, the method includes maintaining the main fuel injection as a single injection and not enabling a split main injection. Herein, the method may resume providing fuel to the engine for a main fuel injection as a single injection with a timing and amount as planned (in accordance to the planned main injection fuel profile).

In some examples, additionally or optionally, it may be determined whether a vehicle operator has wanted to enable split fuel injection. If user input regarding a request for split fuel injection is not received, then method may maintain the single main fuel injection.

If any one of the parameters assessed at 302 have exceeded their corresponding targets/limits, the method moves to 306 to estimate or measure a maximum motored cylinder pressure. As used herein, the maximum motored cylinder pressure corresponds to the maximum cylinder pressure produced by mechanical compression of the engine, when the engine is rotating without any fuel injections and combustion. The maximum motored cylinder pressure may be calculated or estimated using one or more of in-cylinder pressure and/or temperature measurements, calibration tables, and engine sensors monitoring engine boundary conditions. The estimates may be based on, as an example, a calibration map stored as a function of engine speed/load conditions in the controller's memory. As another example, the estimates may be based on a correlation function that takes into account the engine's displacement, cylinder geometry, effective compression ratio, intake pressure, exhaust pressure, intake temperature, and air flow, among other factors. The estimation may be further based on an energy density of the available fuel in the fuel tank.

At 308, the method includes determining a maximum cylinder pressure (or a cylinder peak pressure limit) for the cylinder based on the current engine operating conditions. For example, a cylinder peak pressure limit may be determined for the cylinder based at least on engine speed and torque demand, and further based on temperatures, including turbine inlet temperature. The engine controller may determine the maximum cylinder pressure based on, as an example, a calibration table mapped as a function of engine speed versus demanded indicated torque, as well as turbine inlet temperature (where the limit is reduced if turbine inlet temperature reaches a maximum threshold temperature). As another example, the maximum cylinder pressure may be based on a correlation function between engine speed and demanded indicated torque.

At 310, the method includes comparing the maximum motored cylinder pressure to the maximum cylinder pressure and estimating a peak pressure margin based on a difference between the maximum motored cylinder pressure and the maximum cylinder pressure. In particular, the controller may subtract the maximum cylinder pressure (or cylinder pressure limit) from the estimated maximum motored cylinder pressure to produce an estimated peak pressure margin.

At 312, the method includes determining if the peak pressure margin is higher than a minimum threshold for a split main injection (threshold min). In other words, it is determined if the cylinder will be operating at or beyond the cylinder peak pressure target with the single main fuel injection. As such, if the cylinder is operating at or beyond the cylinder peak pressure target with the single main fuel injection, combustion phasing may need to be retarded, resulting in a fuel and enthalpy penalty. During such conditions, split main fuel injection may be advantageously used to advance the combustion phasing (or reduce the amount of combustion phasing retard required) while maintaining the cylinder pressure within limits.

Specifically, if the peak pressure margin is higher than the threshold, then at 316, the method includes enabling a split main fuel injection. For example, an enable split fuel injection command may be sent from the controller to the fuel injector. At 318, the method further includes determining an initial split fuel injection profile. This may be a split fuel injection profile determined based on the operating conditions and the originally planned main fuel injection prior to further calibration. For example, a number of injections of the split injection may be determined. As such, the main injection may be split into at least a first and a second injection. In addition to the number of injections of the split injection, the initial split injection profile may include an initial timing of each injection (such as a start of injection timing, an end of injection timing, and an average injection timing), a duration of each injection, and an amount of fuel in each injection.

As such, the goal of adjusting the fuel injection profile is to maximize brake specific fuel consumption (BSFC) and advance the end of combustion as much as possible while meeting the commanded load from the user. The profile is adjusted to produce a flat pressure trace, or at least as flat as possible at the maximum cylinder pressure while combustion is occurring in cylinder. This ensures the maximum amount of thermodynamic work (i.e. pressure multiplied by the change in volume) is being produced.

As an example, the planned main injection may be split into two or more smaller injections. A start of injection timing for a first of the smaller injections may be advanced (relative to the start of timing of the planned main injection) and an amount of fuel provided in the first injection may be increased until a first peak pressure occurs at a target pressure. In particular, a phasing of the first injection is advanced while adjusting the quantity to achieve the target pressure until maximum efficiency (as estimated by thermal efficiency, mean effective pressure, combustion stability, etc.) is achieved. For example, a timing of the first injection may be advanced relative to a timing of the planned main fuel injection to maintain a peak in-cylinder pressure of the first injection at or below a peak pressure limit. A duration of the first injection may then be ended when the peak in-cylinder pressure of the first injection reaches the peak pressure limit.

In another example, the timing, duration and amount of fuel delivered in the first injection may be determined based on operator torque demand (or engine load)

While adjusting the quantity of first injection, a quantity of a second (and one or more subsequent) injections is correspondingly decreased to maintain the total fuel quantity (as the planned main injection). The phasing of the second (and one or more subsequent) split injections is then moved as close as possible to the end of the preceding injection without exceeding the cylinder pressure target. The injection quantity is then maximized until it reaches the peak pressure, if the cylinder pressure is responsive to fuel quantity. For example, an engine controller may retard the timing of the second injection relative to the tiring of the planned main fuel injection to maintain a peak in-cylinder pressure of the second injection at or below the peak pressure limit. A spacing between the peak in-cylinder pressure of the second injection and the peak in-cylinder pressure of the first injection is limited by the injector, the spacing determined based on a physical minimum hardware delay between the end of the first injection and the start of the second injection.

Additionally, or alternatively if the cylinder pressure is not responsive to fuel quantity, the injection quantity may be maximized until a turbine inlet temperature reaches a target temperature. For example, if the turbine inlet temperature is not raised sufficiently, a duration of the second (or subsequent) injections may be extended or an end of injection timing may be retarded. For example, the engine may be a boosted engine including an intake compressor driven by an exhaust turbine, wherein the duration of the second injection is adjusted based on an inlet temperature of the turbine, the duration decreased as the turbine inlet temperature increases above a threshold temperature. By optimizing based on cylinder pressure, engine performance is improved. By optimizing based on turbine inlet temperature, turbo lag may be reduced. It will be appreciated that the timing and duration of each of the first and second injection may be further adjusted based on an estimated BSFC of the engine, to improve engine fuel economy while providing the retarded combustion phasing. As such, while splitting the planned main fuel injection, a timing and duration of the pilot fuel injection may be maintained.

Figure 4:
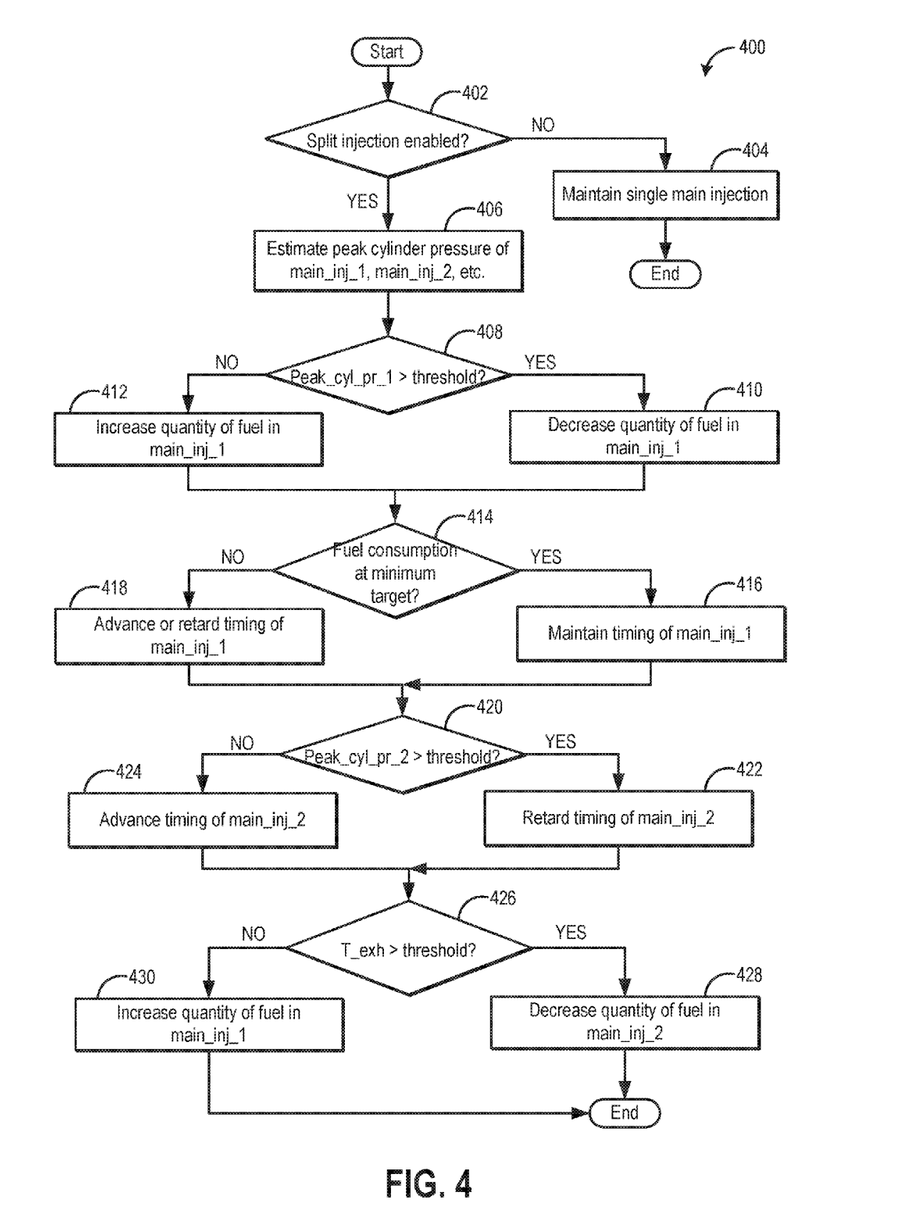
FIG. 4 depicts a flowchart illustrating an example method for calibrating each injection of a split main fuel injection.
Figure 5:
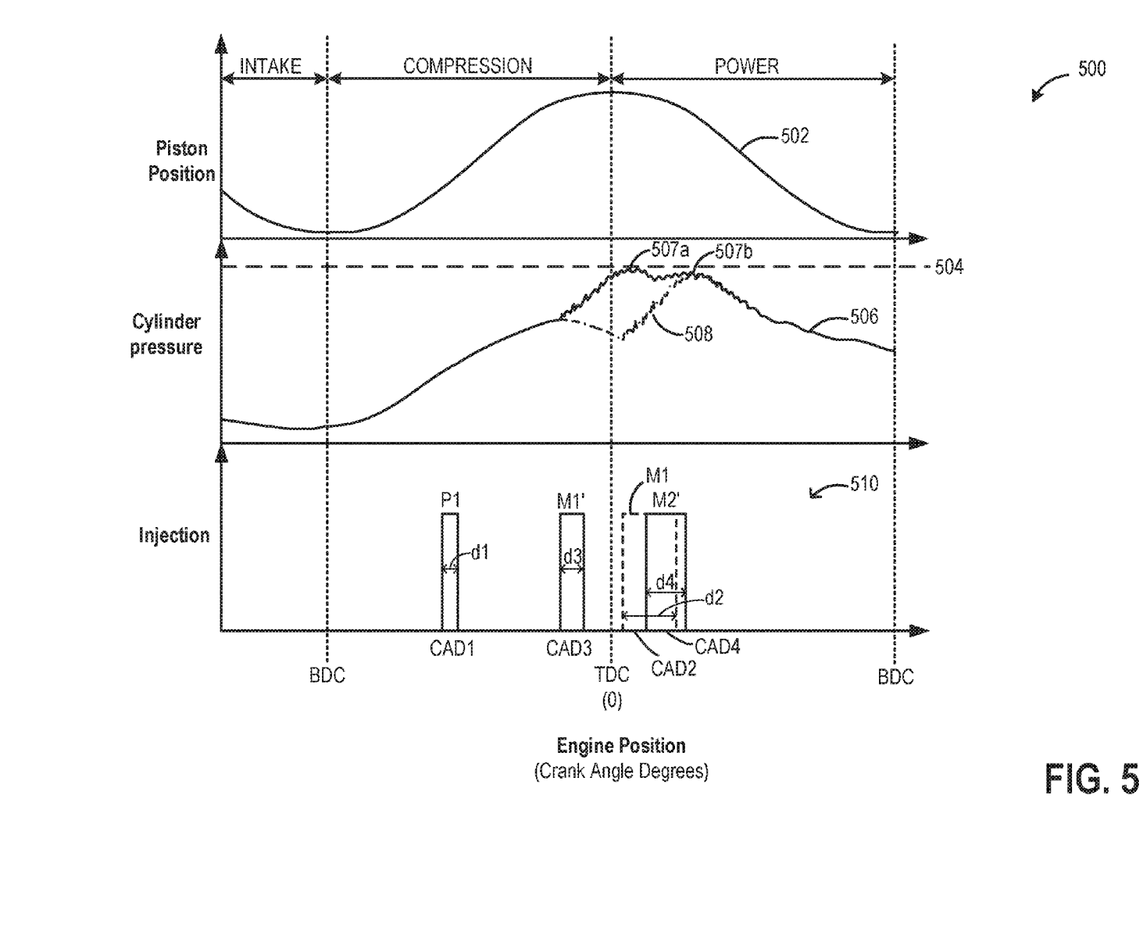
FIG. 5 illustrates an example use of a split main fuel injection for cylinder pressure and/or exhaust temperature control.

At 320, the method then includes calibrating the split fuel injection, as elaborated with reference to FIG. 4. At 322, the method includes maintaining the use of a split injection event over one or more cylinder combustion events until both the cylinder pressure and the turbine inlet temperature are at their target values. That is, the main injection for multiple consecutive cylinder combustion events may be split into multiple smaller injections until the target exhaust pressure and/or temperature profile is achieved.

If the peak pressure margin is lower than the threshold, then at 314, the method includes maintaining the single main fuel injection and not enabling a split main fuel injection. For example, a disable split fuel injection command may be sent from the controller to the fuel injector.

Turning now to FIG. 4, an example method 400 is shown for calibrating a split main fuel injection after a decision to enable the splitting of a main fuel injection is made. The calibration includes adjusting a timing and duration of each injection of the split fuel injection based on a peak pressure target or limit of the cylinder, as well as based on engine fuel consumption considerations. For example, the adjusting may be based on an output of an in-cylinder pressure sensor relative to the defined peak pressure target of the cylinder. Method 400 may constitute a split injection optimization sub-routine of the primary control loop of method 200. In one example, method 400 may be executed as part of method 200, such as at 210, and/or as part of method 300, such as at 320.

Method 400 includes, at 402, confirming that split injection is enabled. That is, it may be confirmed that a decision to split the main injection has been confirmed and a signal for splitting the main fuel injection has been commanded by the engine controller. As such, the split injection may include at least a first injection and a second injection. The main fuel injection may be split into still more injections. If split injection is not confirmed, at 404, the method includes maintaining a single main fuel injection.

At 406, upon confirming that split injection is enabled, the method includes estimating a peak cylinder pressure for each of the injections of the split fuel injection. For example, a peak cylinder pressure for the first injection of the split main injection (main_inj_1) and for the second injection of the split main injection (main_inj_2) may be estimated. The peak cylinder pressure for each injection may be calculated or estimated using one or more of in-cylinder pressure and/or temperature measurements, calibration tables, and engine sensors monitoring engine boundary conditions. The estimates may be based on, as an example, a calibration map mapped as a function of engine speed/load conditions and saved in the controller's memory. As another example, the estimates may be based on a correlation function that takes into account the engine's displacement, cylinder geometry, effective compression ratio, intake pressure, exhaust pressure, intake temperature, and air flow, among other factors.

The controller then proceeds to calibrate the first injection and the second injection. In the present example, the first and second injections are shown being calibrated sequentially. However, it will be appreciated that in alternate examples the first and second injections may be calibrated concurrently.

In particular, at 408, it may be determined if the estimated peak cylinder pressure for the first injection (Peak_cyl_pr_1) is higher than a threshold. The threshold may be a maximum cylinder pressure (or a cylinder peak pressure limit) for the cylinder that is determined based on the engine operating conditions, such as based on engine speed and torque demand, as discussed earlier at FIG. 3. If the peak cylinder pressure for the first injection is higher than the threshold, then at 410, the method includes decreasing the quantity of fuel in the first injection. The quantity of fuel in the first injection of the split injection may be decreased using, as one example, a closed feedback control loop that is based on peak cylinder pressure (as measured by an in-cylinder pressure sensor). In another example, the quantity of fuel in the first injection may be decreased using a feed-forward correlation between fuel quantity, a start of injection timing, and peak cylinder pressure for the first injection. Else, if the peak cylinder pressure for the first injection is lower than the threshold, then at 412, the method includes increasing the quantity of fuel in the first injection. The quantity of fuel in the first injection of the split injection may be increased using, as one example, a closed feedback control loop that is based on peak cylinder pressure (as measured by an in-cylinder pressure sensor). In another example, the quantity of fuel in the first injection may be increased using a feed-forward correlation between fuel quantity, a start of injection timing, and peak cylinder pressure for the first injection.

From each of 410 and 41, the method proceeds to 414, wherein it is determined if the engine's fuel consumption rate is at a minimum target rate. For example, it may be determined if the engine's fuel consumption rate is at a lower BSFC limit. If yes, then at 416, the method includes maintaining a timing of the first injection. Else, if the engine's fuel consumption rate is not at the minimum target rate (that is, fuel consumption is higher than desired), then at 418, the method includes adjusting the timing of the first injection. Herein, the timing of the first injection may be advanced or retarded from the timing of the planned single main fuel injection. In one example, the timing may be adjusted using a feed-forward correlation between fuel consumption, a start of injection timing, and the quantity of fuel delivered in the first injection.

After calibrating the first injection, the method proceeds to calibrate the second injection. Specifically, from each of 416 and 418, the method proceeds to 420 wherein it may be determined if the estimated peak cylinder pressure for the second injection (Peak_cyl_pr_2) is higher than a threshold. The threshold may be the maximum cylinder pressure (or a cylinder peak pressure limit) for the cylinder that is determined based on the engine operating conditions, such as based on engine speed and torque demand, as discussed earlier at FIG. 3. In the present example, the peak pressure of the first and second injections are compared to a common threshold. However, it will be appreciated that in alternate examples, the peak pressure of the second injection may be compared to a threshold that is distinct from (e.g., higher or lower than) a threshold that the peak pressure of the first injection is compared to.

If the peak cylinder pressure for the second injection is higher than the threshold, then at 422, the method includes retarding a timing of the second injection. Herein, the timing of the second injection is retarded relative to the timing of the planned single main fuel injection. As one example, the timing of the second injection may be retarded using a closed feedback control loop that is based on peak cylinder pressure (as measured by an in-cylinder pressure sensor). In another example, the timing of the second injection may be retarded using a feed-forward correlation between a start of injection timing, and peak cylinder pressure for the second injection.

If the peak cylinder pressure for the second injection is lower than the threshold, then at 424, the method includes advancing a timing of the second injection. Herein, the timing of the second injection is advanced relative to the timing of the planned single main fuel injection. As one example, the timing of the second injection may be advanced using a closed feedback control loop that is based on peak cylinder pressure (as measured by an in-cylinder pressure sensor). In another example, the timing of the second injection may be advanced using a feed-forward correlation between a start of injection timing, and peak cylinder pressure for the second injection.

From each of 422 and 424, the method proceeds to 426, wherein it is determined if the exhaust temperature (T_exh) is higher than a threshold temperature. For example, it may be determined if the exhaust temperature is higher than a temperature limit above which engine component degradation may occur. Alternatively, it may be determined if the exhaust temperature is higher than a catalyst light-off/activation temperature.

If the exhaust temperature is higher than the threshold temperature, then at 428, the method includes decreasing the quantity of fuel in the second injection. In one example, the quantity of fuel in the second injection of the split injection may be decreased using a closed feedback control loop that is based on exhaust temperature (as measured by an exhaust manifold temperature sensor). In another example, the quantity of fuel in the second injection may be decreased using a feed-forward correlation between an end of combustion timing (or an end of injection timing for the second injection) and exhaust temperature. As such, a timing of the second injection may be adjusted such that the second injection is retarded from the first injection.

Else, if the exhaust temperature is lower than the threshold temperature, then at 430, the method includes increasing the quantity of fuel in the second injection. The quantity of fuel in the second injection of the split injection may be increased using, as one example, a closed feedback control loop that is based on indicated torque. In another example, the quantity of fuel in the second injection may be increased using a feed-forward correlation between fuel quantity, and indicated torque for the second injection.

In some examples, the adjusting of the first and second injection is performed concurrently. For example, the fuel injection quantity of the first injection is adjusted to meet the user torque demand, the first fuel injection quantity determined using a correlation or calibration map based on experimental data relating the main injection quantity to an indicated torque. This is done because the actual indicated or brake torque is not physically measured on the engine. The final injection of the split injections may then be used to meet the user torque demand with the amount increased until the user commanded torque is reached and the exhaust temperature is below the maximum allowable exhaust temperature. Otherwise the engine may de-rate itself and stop increasing fuel quantity to the final split-main injection.

In examples where the split injection includes additional injections, the engine controller may calibrate the additional injections in the same manner as discussed above. After calibrating each of the first and second (and additional) injections, the calibrated settings may be updated in the engine controller's memory and the routine may end. Thereafter, the engine may resume fuel delivery with the calibrated fuel injection settings.

In one example, the calibration method discussed above may be implemented as a fixed calibration strategy within the engine controller. Alternatively, the calibration method may be coupled with a combustion feedback sensor, such as an in-cylinder pressure sensor, and the calibration may be activated as required.

Further still, the calibration may be further updated based on information regarding the type of fuel available for injection. For example, using IMEP measurements, or based on output from an exhaust oxygen sensor, a controller may determine if the fuel has a higher or lower energy density and adjust the calibration of the main injection (including the number of split injections, the timing and duration of the split injections, etc.) in accordance, thereby compensating for fuel differences. In one example, when the energy density of the fuel is lower (e.g., when the fuel is biodiesel or an oxygenated fuel), the calibration may include a larger number of injections in the split injection. In comparison, when the energy density of the fuel is higher (e.g., when the fuel is diesel), the calibration may include a smaller number of injections in the split injection. As such, the energy density directly affects the injection durations. A higher energy density will require shorter injections and in many cases fewer injections will be needed to achieve the same load and engine efficiencies. Further still, the controller may make adjustments to the split injection in each individual cylinder based on information from a cylinder-specific combustion feedback system (such as am in-cylinder pressure sensor), thereby accounting for possible cylinder-to-cylinder differences in compression ratio or airflow.

Further still, the duration of the second injection may be adjusted based on one or more of a turbine inlet temperature, exhaust NOx level, exhaust tailpipe hydrocarbon level, and exhaust CO emissions. The values may be a modeled or measured. Further, the controller may shift between calibrations that are tailored specifically to warming up each after-treatment catalyst individually.

As one example, a planned main injection profile may include a single retarded injection starting at 2 CAD before TDC and ending at 10 CAD after TDC, with a peak cylinder pressure occurring around 16 CAD after TDC. In response to the retarded combustion phasing, the main injection may be split into two injections including a first injection initiated at 10 CAD before TDC and continued till 6 CAD before TDC, and a second injection initiated at 6 CAD before TDC and continued till 12 CAD after TDC.

In another example, a first injection (including timing, duration, and amount of fuel) of the split injection may be adjusted based on user torque demand. Then, the second injection (including timing, duration, and amount of fuel) may be calibrated to generate exhaust temperature and enthalpy. This is because the second injection produces less torque than the first injection on account of it combusting farther away from TDC.

It will he appreciated that while the methods disclosed above discuss splitting a main injection and calibrating each of the split injections to increase cylinder pressure and exhaust temperature to target temperatures that are within predefined limits, in alternate examples, the split injection may be calibrated to decrease cylinder pressures and exhaust temperatures to target temperatures. For example, the calibration may be used to reduce the cylinder peak pressure at a target torque and power level, thereby improving engine durability.

An embodiment of an example split main fuel injection profile according to the present disclosure is presented in map 500 of FIG. 5. Map 500 illustrates an engine position along the x-axis in crank angle degrees (CAD). Referring now to the top plots in each map, curve 502 depicts piston positions (along the y-axis) with reference to their location from top dead center (TDC) and/or bottom dead center (BDC), and further with reference to their location within the four strokes (intake, compression, power and exhaust) of an engine cycle. Map 500 specifically depicts the compression and power strokes to demonstrate fuel injections occurring at or around TDC piston position between the compression and power strokes. As indicated by sinusoidal curve 502, a piston gradually moves upward from BDC (after completing an intake stroke) to TDC by the end of a compression stroke. The piston then returns to BDC by the end of the power stroke.

The middle plot of map 500 depicts a cylinder pressure profile for a cylinder undergoing combustion. A cylinder pressure profile for a planned single main fuel injection in the cylinder, shown by dashed curve 508, is compared to the cylinder pressure profile for a split main fuel injection in the cylinder, shown by solid curve 506.

The bottom plot 510 depicts an example fuel injection profile for the cylinder undergoing combustion. A fuel pressure profile (including timing, duration, etc.) for the planned single main fuel injection in the cylinder, shown by dashed lines (M1), is compared to the fuel injection profile for the split main fuel injection in the cylinder, shown by solid lines (M1' and M2'). In the present example, the profile of a pilot injection (P1) preceding the main fuel injection is maintained.

In this example, the engine may be a compression ignition engine which, as a non-limiting example, may be combusted by a fuel such as diesel or biodiesel.

An engine controller may determine an initial fuel injection profile for delivering a total amount of fuel. In the initial profile, the engine controller may provide the total amount of fuel to the cylinder as two injections including a first single pilot injection P1 (also referred to as a "fat" pilot injection) and a second single main injection M1. The first pilot injection P1 may be scheduled to be provided earlier during the compression stroke at CAD1 for a duration d1 while the second main injection may be scheduled to be provided later during the power stroke at CAD2 for a duration d2. For example, the first pilot injection P1 comprising 1-20% of the total injected fuel may be scheduled to be delivered at 32 CAD BTDC. A remainder of the total fuel may then be delivered at 2 CAD ATDC. As a result of this fuel injection profile, a peak cylinder pressure may occur around 16 CAD ATDC, as indicated by dashed curve 508. Herein, to enable the peak cylinder pressure to not exceed peak cylinder pressure limit 504 (e.g., at or around 150 bar), the combustion phasing is retarded such that the peak cylinder pressure occurs later in the power stroke.

In order to enhance combustion performance, and improve exhaust temperature and. cylinder pressure control, the planned single main fuel injection M1 may be split into multiple smaller injections. In the present example, the single main injection is split into a first main injection Mr and a second main injection M2'. The first main injection M1' is provided at CAD3 for a duration d3 while the second main injection M2' is provided at CAD4 for a duration d4. In particular, the first main injection is advanced relative to the single main injection (CAD3 is advanced relative to CAD2) while the second main injection is retarded relative to the single main injection (CAD3 is retarded relative to CAD2). As one example, the first main injection may be provided at 10 ATDC while the second main injection is provided at 6 ATDC.

In addition to advancing the first injection, a duration of the first injection (and thereby the quantity of fuel in the first injection) is increased until a peak cylinder pressure resulting from the first injection (depicted by first hump 507*a* of plot 506) occurs at the target pressure, that is, at or just below pressure limit 504. Then, a remainder of the fuel is provided in the second injection. For example, as the quantity of fuel in the first injection is increased, the quantity of fuel in the second injection is correspondingly decreased to maintain the same total fuel delivered via the split injection (that is, fuel_M1'+fuel_M2'=fuel_M1) as the single main injection (M1). In the present example, a smaller portion of the total fuel of the main injection is provided in the first injection while a remaining larger portion is provided in the second injection.

A timing of the second injection is adjusted based on the first injection so that the peak cylinder pressure resulting from the second injection (depicted by second hump 507*b* of plot 506) also occurs at the target pressure, and furthermore, occurs as close as possible to the end of the peak pressure of the first injection. That is, the second injection is advanced as much as possible to be as close as possible to the end of injection timing of the first injection while maintaining the peak cylinder pressure within limits. In addition, a duration of the second. injection may be adjusted based on turbine inlet temperature to provide sufficient exhaust heat. In other words, a timing of the first and second injections is adjusted so that the peaks pressures from the two injections (that is, humps 507*a* and 507*b*) occur as close to each other as possible, for example, immediately after each other, while staying at or below pressure limit 504.

In doing so, cylinder pressure and turbine inlet temperature can be raised to their target values with the use of less combustion phasing retard (in one example, with no combustion phasing retard).

By calibrating the main injection based on the cylinder peak pressure, various advantages are achieved. For example, fuel economy and exhaust emissions are improved. Furthermore, the fuel economy and exhaust emissions improvement is enhanced when used with an engine system having low flow nozzles.

Figure 6:
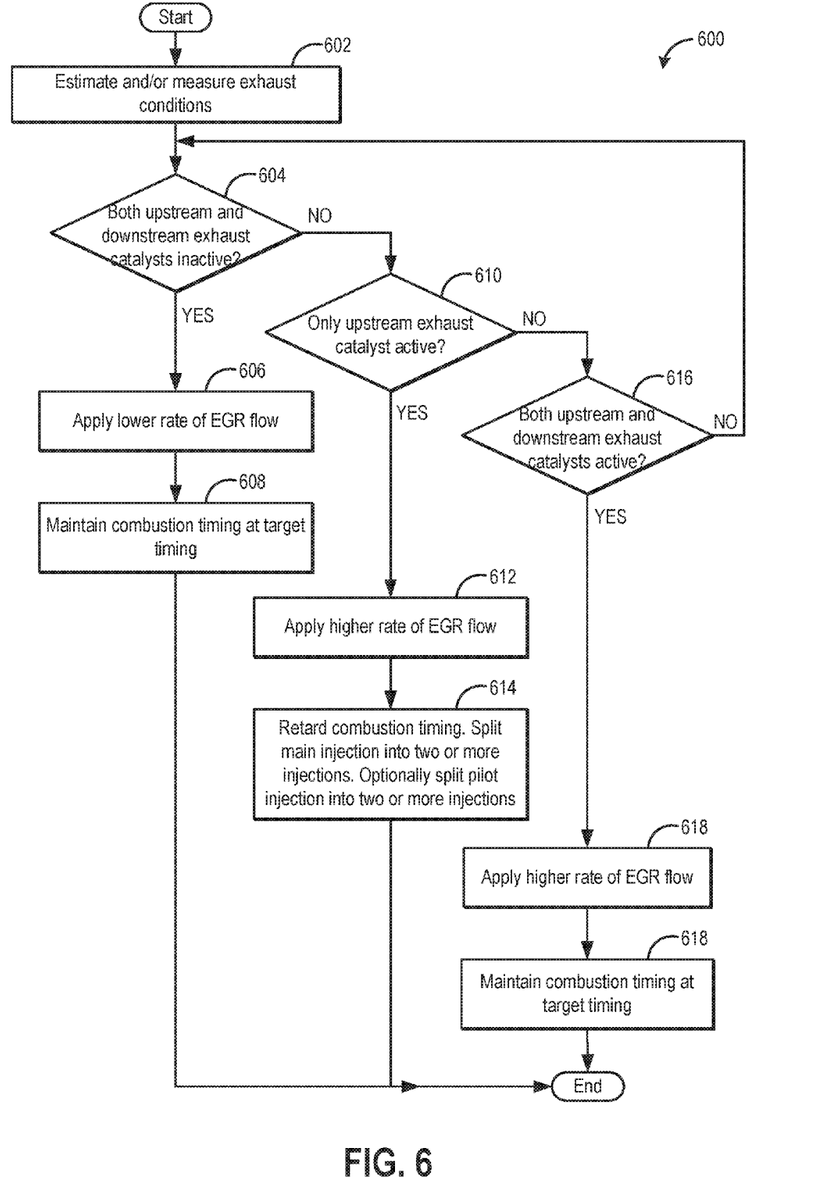
FIG. 6 illustrates a flowchart illustrating an example method for determining whether to split the main fuel injection based on exhaust catalyst conditions.

Turning now to FIG. 6, an example method 600 is shown for adjusting combustion phasing and injection calibration responsive to exhaust catalyst conditions. The method enables improved light-off of an upstream oxidation catalyst (such as a DOC) and a downstream reduction catalyst (such as an SCR) without degrading exhaust emissions and fuel economy.

At 602, the method includes estimating and/or measuring exhaust conditions. These include, for example, an exhaust temperature, an exhaust pressure, and the temperature and activation state of one or more exhaust catalysts. The one or more exhaust catalysts of an emission control device may include, for example, an upstream oxidation catalyst (such as a DOC) and a downstream reduction catalyst (such as an SCR). In addition to exhaust conditions, ambient conditions may also be assessed.

At 604, it may be determined if both the upstream and downstream exhaust catalysts are inactive. For example, if the exhaust temperature is lower than a threshold temperature, both catalysts may be determined to be inactive. In another example, both catalysts may be determined to be inactive during cold ambient conditions.

If both catalysts are inactive, at 606, the method includes operating the engine with a lower EGR rate. In addition, at 610, combustion timing may be maintained at a target timing (such as at NIBT). By lowering the EGR rate responsive to the inactive catalyst conditions, hydrocarbon emissions incurred while the catalysts activate is reduced. In addition, exhaust mass flow rates are increased.

Returning to 604, if both catalysts are not inactive, at 610, it may be determined if only the upstream exhaust catalyst is active. For example, if the exhaust temperature is higher than a light-off temperature of the first catalyst but lower than a light-off temperature of the second catalyst, only the first catalyst may be determined to be active. In another example, only the first, upstream catalyst may be determined to be active if the exhaust temperature has been higher than the threshold temperature for a shorter duration.

If only the first, upstream catalyst is active, at 612, the method includes operating the engine with a higher EGR rate. In addition, at 614, combustion timing may be retarded to raise the peak cylinder pressure and further increase the exhaust temperature. The combustion timing may be retarded by splitting the main injection into two or more smaller injections, and retarding the average start of injection timing. Optionally, a pilot injection preceding the main injection may also be split into two or more smaller injections. Further still, an amount of fuel delivered to the cylinder via port injection may be increased. As a result of the increase in EGR and combustion phasing retard, exhaust temperatures may be increased and exhaust NOx levels may be reduced at the expense of hydrocarbon emissions, which would further increase exhaust temperature when oxidized across the first oxidation catalyst.

Herein, each of the higher and lower EGR rate may be based on each of an age of the upstream and downstream catalysts and an exhaust temperature.

A level of combustion phasing retard and increase in EGR rate applied may be adjusted on one or more parameters associated with the first oxidation catalyst including catalyst body temperature, catalyst outlet temperature, total hydrocarbon (THC) emissions, and conversion efficiency. In addition, the phasing retard and EGR rate may be increased based on catalyst age and engine temperature. Further still, a calibration of the split injection and EGR usage may be adjusted responsive to one or more of exhaust mass flow, exhaust gas temperature, catalyst temperature, estimated exhaust heat transfer coefficient, estimated exhaust Reynolds number, and exhaust system heat transfer. These parameters may be calculated based on data estimated. by a sensor, based on modeled data, or based on expected values for one or more alternative calibrations.

Returning to 610, if the upstream catalyst is not the only active catalyst, at 616, it may be confirmed that both upstream and downstream catalysts are active. For example, if the exhaust temperature is higher than a light-off temperature of each of the first and second catalyst, both the catalysts may be determined to be active. In another example, both catalysts may be determined to be active if the exhaust temperature has been higher than the threshold temperature for a longer duration.

If both upstream and downstream catalysts are active, at 618, the method includes operating the engine with the higher EGR rate. In addition, at 620, combustion timing may be maintained at a target timing (such as at MBT). By raising the EGR rate once both catalysts are active, fuel economy is improved and NOx emissions are decreased.

In one example, the injection and EGR calibration applied when both catalysts are inactive may be a high enthalpy calibration with a modest exhaust temperature (e.g., low EGR rate, low internal EGR rate, cooled EGR, low pressure EGR, high boost pressure), while the calibration applied when only the upstream catalyst is active may be a high exhaust temperature calibration with less exhaust enthalpy (e.g., high pressure uncooled EGR and/or internal EGR, low boost pressure). An engine controller may select a calibration to apply based on the expected heat transfer to the catalyst(s). The difference between the minimal THC and minimal NOx calibrations as well as low and high exhaust enthalpy calibrations may be set to be as simple as adjusting a single calibration parameter, such as EGR rate. Alternatively, the change may involve multiple calibration actuators, such as one or more of engine speed, load, EGR cooler bypass, internal EGR amount, boost pressure, etc.

In still another example, the controller may split the main fuel injection into at least a first injection and a second injection. The first injection may be advanced or retarded from the combustion timing of the planned main fuel injection, the timing, duration and amount of fuel in the first injection adjusted based on engine load or user torque demand. Then, the second injection may be adjusted based on catalyst temperature. For example, the second injection timing may be retarded from the first injection and an amount of fuel in the second injection may be limited (below the amount desired) when the first, upstream catalyst has not achieved light-off, the amount of fuel in the second injection increased after the first catalyst has achieved light-off, the amount increased to enable the second catalyst to attain light-off. As such, the quantity of fuel in the second injection, and not the first injection directly affect the temperature of the catalysts. However, the quantity of fuel in the second injection is limited by HC emissions. As a result, the quantity of fuel in the second injection is limited until the upstream catalyst (e.g., the DOC responsible for tailpipe THC emissions) is active and has attained light-off. Once the upstream catalyst is active, the quantity of fuel in the second injection can be increased in order to increase the exhaust temperature and expedite light-off of the second downstream catalyst. This is because the first upstream catalyst, once active, mitigates HC emissions so more fuel can be added to the second injection without significantly increasing tailpipe emissions. In an alternate example, the duration of the first injection is based on a temperature of the first, upstream catalyst while the duration of the second injection is adjusted based on a temperature of the second, downstream catalyst.

In this way, engine calibration can be shifted along a NOx-THC trade-off curve. Further, the calibration may continually optimize the exhaust gas conditions based on the functional state of the after-treatment catalysts. Overall, a time to light-off may be reduced while still controlling tailpipe emissions, thereby increasing emissions compliance.

An example method for an engine comprises: in response to predicted peak in-cylinder pressure for a planned main fuel injection into a cylinder occurring later than a threshold timing, splitting the planned main fuel injection into at least a first and second injection, wherein the first injection is advanced relative to a timing of the planned main fuel injection. In the preceding example, the method may additionally or optionally further comprise adjusting a timing and duration of each of the first and second injection based on a peak pressure target of the cylinder. in any or all of the preceding examples, additionally or optionally, the adjusting based on a peak pressure limit of the cylinder includes adjusting based on an output of an in-cylinder pressure sensor relative to the peak pressure target. In any or all of the preceding examples, additionally or optionally, the adjusting includes advancing the timing of the first injection relative to the timing of the planned main fuel injection to maintain a peak in-cylinder pressure of the first injection at or below the peak pressure target. In any or all of the preceding examples, additionally or optionally, the method further includes ending a duration of the first injection when the peak in-cylinder pressure of the first injection reaches the peak pressure target. In any or all of the preceding examples, additionally or optionally, the adjusting further includes retarding the timing of the second injection relative to the timing of the first injection to maintain a peak in-cylinder pressure of the second injection at or below the peak pressure target. In any or all of the preceding examples, additionally or optionally, the engine is a boosted engine including an intake compressor driven by an exhaust turbine, wherein the duration of the second injection is further adjusted based on an inlet temperature of the turbine, the duration decreased as the turbine inlet temperature increases above a threshold temperature. In any or all of the preceding examples, additionally or optionally, the timing and duration of each of the first and second injection is further adjusted based on an estimated BSFC of the engine. In any or all of the preceding examples, the planned main fuel injection is a main injection following a pilot fuel injection, and wherein the cylinder pressure has only two peaks, each of the two peaks corresponding to one of the two injections, and where the two peaks are within a threshold of each other including within 10% of each other but both below a maximum allowable cylinder pressure determined based on engine operating conditions. In any or all of the preceding examples, additionally or optionally, the planned main fuel injection is a main injection following a pilot fuel injection. In any or all of the preceding examples, additionally or optionally, while splitting the planned main fuel injection, a timing and duration of the pilot fuel injection is maintained.

Another example method for an engine comprises: operating an engine with combustion timing at a target timing and a lower EGR. rate until a first, upstream exhaust catalyst is higher than a threshold temperature; and then, operating the engine with combustion timing retarded from the target timing and a higher EGR rate to expedite heating of a second, downstream exhaust catalyst, the retarded combustion timing including a split fuel injection. In the preceding example, additionally or optionally, operating the engine with combustion timing retarded from the target timing includes splitting a planned main fuel injection into at least a first and second injection, wherein a timing of the first injection s calibrated based on operator torque demand and wherein a timing of the second injection is retarded relative to the timing of the first injection, and wherein an injection amount of the second injection is based on exhaust temperature. In any or all of the preceding examples, additionally or optionally, each of the lower EGR rate and the higher EGR rate are adjusted based on each of an age of the first and second catalysts, an engine temperature, and an exhaust temperature. In any or all of the preceding examples, additionally or optionally, a duration between an end of the first injection and a start of the second injection is adjusted based on a temperature of the second catalyst. In any or all of the preceding examples, additionally or optionally, the engine is a turbocharged engine and a duration of the second injection is adjusted based on one or more of a turbine inlet temperature, exhaust NOx level, exhaust tailpipe hydrocarbon level, and exhaust CO level.

Another example method for a boosted engine comprises: during a first condition, splitting a fuel injection and advancing an average combustion timing of the split fuel injection based on peak cylinder pressure and turbine inlet temperature; and during a second condition, splitting the fuel injection and retarding the average combustion timing of the split fuel injection based on catalyst temperature. In any or all of the preceding examples, additionally or optionally, splitting the fuel injection includes splitting a planned main fuel injection following a pilot injection of a combustion cycle, wherein during the first condition, the average combustion timing of the split fuel injection is advanced relative to a combustion timing of the planned main fuel injection, and wherein during the second condition, the average combustion timing of the split fuel injection is retarded relative to the combustion timing of the planned main fuel injection. In any or all of the preceding examples, additionally or optionally, during the first condition, the splitting includes splitting the fuel injection into at least a first injection advanced from the combustion timing of the planned main fuel injection and at least a second injection retarded from the combustion timing of the planned main fuel injection, a duration of the first injection and a duration between the first injection and the second injection adjusted based on estimated peak cylinder pressure relative to a cylinder pressure limit, a duration of the second injection adjusted based on the turbine inlet temperature. In any or all of the preceding examples, additionally or optionally, during the second condition, the splitting includes splitting the fuel injection into at least a first injection advanced or retarded from the combustion timing of the planned main fuel injection and at least a second injection retarded from the combustion timing of the first injection, the first injection based on engine load, the second injection based on the catalyst temperature. In any or all of the preceding examples, additionally or optionally, the engine includes each of a first upstream exhaust catalyst and a second downstream exhaust catalyst coupled to an engine exhaust manifold, and wherein during the first condition, each of the first and second exhaust catalysts have achieved light-off, and wherein during the second condition, an amount of fuel in the second injection is limited when the first exhaust catalyst has not achieved light-off, and wherein the amount of fuel in the second injection is increased after the first exhaust catalyst has achieved light-off, the amount increased to light-off the second exhaust catalyst.

The technical effect of splitting a main injection into multiple smaller injections is that power, torque, and fuel consumption of the engine may be improved even under conditions in which injection timing is retarded to keep cylinder pressures within peak pressure limits. By calibrating the injections, power and torque output from the fuel injection can be increased without requiring expensive and complicated changes to engine hardware, such as changes that would be otherwise required to increase peak firing pressure or exhaust temperature. In addition, the power and torque output can be increased without increasing injector nozzle size, which could otherwise degrade exhaust emissions and fuel economy. Further, the approach is compatible with the use of low flow nozzles. By enabling low flow nozzles to be used, injector limitations restricting the injected quantity per injection may be overcome. Furthermore, a target engine power and torque may be achieved even when using low energy density fuels. Finally, a time to catalyst light-off may be reduced while still controlling tailpipe emissions, improving engine emissions compliance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
in response to predicted peak in-cylinder pressure for a planned main fuel injection into a cylinder occurring later than a threshold timing, splitting the planned main fuel injection into at least a first and a second injection, wherein the first injection is advanced relative to a timing of the planned main fuel injection; and
adjusting a timing and duration of each of the first and second injections based on a peak pressure target of the cylinder,
wherein the engine is a boosted engine including an intake compressor driven by an exhaust turbine, and
wherein the duration of the second injection is further adjusted based on an inlet temperature of the turbine, the duration decreased as the turbine inlet temperature increases above a threshold temperature.

2. The method of claim 1, wherein the adjusting based on a peak pressure limit of the cylinder includes adjusting based on an output of an in-cylinder pressure sensor relative to the peak pressure target.

3. The method of claim 1, wherein the adjusting includes, advancing the timing of the first injection relative to the timing of the planned main fuel injection to maintain a peak in-cylinder pressure of the first injection at or below the peak pressure target.

4. The method of claim 3, ending a duration of the first injection when the peak in-cylinder pressure of the first injection reaches the peak pressure target.

5. The method of claim 3, wherein the adjusting further includes retarding the timing of the second injection relative to the timing of the first injection to maintain a peak in-cylinder pressure of the second injection at or below the peak pressure target.

6. The method of claim 1, wherein the timing and duration of each of the first and second injections is further adjusted based on an estimated BSFC of the engine.

7. The method of claim 1, wherein the planned main fuel injection is a main injection following a pilot fuel injection, and where cylinder pressure has only two peaks, each peak corresponding to one of two main injections, and where the two peaks are within a threshold of each other including within 10% of each other but both below a maximum allowable cylinder pressure determined based on engine operating conditions.

8. The method of claim 7, wherein, while splitting the planned main fuel injection, a timing and duration of the pilot fuel injection is maintained.

9. A method for an engine, comprising:
operating an engine with combustion timing at a target timing and a lower EGR rate until a temperature of a first, upstream exhaust catalyst is higher than a threshold temperature; and
then, operating the engine with combustion timing retarded from the target timing and a higher EGR rate to expedite heating of a second, downstream exhaust catalyst, the retarded combustion timing including a split fuel injection.

10. The method of claim 9, wherein operating the engine with combustion timing retarded from the target timing includes splitting a planned main fuel injection into at least a first and a second injection, wherein a timing of the first injection is calibrated based on operator torque demand and wherein a timing of the second injection is retarded relative to the timing of the first injection, and wherein an injection amount of the second injection is based on exhaust temperature.

11. The method of claim 10, wherein each of the lower EGR rate and the higher EGR rate are adjusted based on each of an age of the first and second catalysts, an engine temperature, and an exhaust temperature.

12. The method of claim 10, wherein a duration between an end of the first injection and a start of the second injection is adjusted based on a temperature of the second catalyst.

13. The method of claim 10, wherein the engine is a turbocharged engine and wherein a duration of the second injection is adjusted based on one or more of a turbine inlet temperature, exhaust NOx level, exhaust tailpipe hydrocarbon level, and exhaust CO level.

14. A method for a boosted engine, comprising:
during a first condition, splitting a fuel injection and advancing an average combustion timing of the split fuel injection based on peak cylinder pressure and turbine inlet temperature; and
during a second condition, splitting the fuel injection and retarding the average combustion timing of the split fuel injection based on catalyst temperature.

15. The method of claim 14, wherein splitting the fuel injection includes splitting a planned main fuel injection following a pilot injection of a combustion cycle, wherein, during the first condition, the average combustion timing of the split fuel injection is advanced relative to a combustion timing of the planned main fuel injection, and wherein, during the second condition, the average combustion timing of the split fuel injection is retarded relative to the combustion timing of the planned main fuel injection.

16. The method of claim 15, wherein, during the first condition, the splitting includes splitting the fuel injection into at least a first injection advanced from the combustion timing of the planned main fuel injection and at least a second injection retarded from the combustion timing of the planned main fuel injection, a duration of the first injection and a duration between the first injection and the second injection adjusted based on estimated peak cylinder pressure relative to a cylinder pressure limit, a duration of the second injection adjusted based on the turbine inlet temperature.

17. The method of claim 15, wherein, during the second condition, the splitting includes splitting the fuel injection into at least a first injection advanced or retarded from the combustion timing of the planned main fuel injection and at least a second injection retarded from the combustion timing of the first injection, the first injection based on engine load, the second injection based on the catalyst temperature.

18. The method of claim 17, wherein the engine includes each of a first upstream exhaust catalyst and a second downstream exhaust catalyst coupled to an engine exhaust manifold, and wherein, during the first condition, each of the first and second exhaust catalysts has achieved light-off, and wherein, during the second condition, an amount of fuel in the second injection is limited when the first exhaust catalyst has not achieved light-off, and wherein the amount of fuel in the second injection is increased after the first exhaust catalyst has achieved light-off, the amount increased to light-off the second exhaust catalyst.

* * * * *